United States Patent
Miller et al.

(10) Patent No.: US 10,391,675 B2
(45) Date of Patent: Aug. 27, 2019

(54) CONVERTIBLE RECYCLING APPARATUS FOR SYNTHETIC RESIN MATERIALS

(71) Applicants: Daniel T. Miller, Boardman, OH (US); Dean E. Grindley, III, Sebring, OH (US)

(72) Inventors: Daniel T. Miller, Boardman, OH (US); Dean E. Grindley, III, Sebring, OH (US)

(73) Assignee: MILLCO PRODUCT SOLUTIONS LLC, Salem, OH (US)

( * ) Notice: Subject to any disclaimer, the term of this patent is extended or adjusted under 35 U.S.C. 154(b) by 680 days.

(21) Appl. No.: 15/135,996

(22) Filed: Apr. 22, 2016

(65) Prior Publication Data
US 2017/0304839 A1   Oct. 26, 2017

(51) Int. Cl.
| | | |
|---|---|---|
| B02C 23/00 | (2006.01) | |
| B29B 9/02 | (2006.01) | |
| B02C 7/08 | (2006.01) | |
| B02C 7/12 | (2006.01) | |
| B02C 7/17 | (2006.01) | |
| B02C 18/08 | (2006.01) | |
| B02C 18/18 | (2006.01) | |
| B02C 23/12 | (2006.01) | |
| B02C 23/14 | (2006.01) | |
| B29B 17/04 | (2006.01) | |

(52) U.S. Cl.
CPC ................ B29B 9/02 (2013.01); B02C 7/08 (2013.01); B02C 7/12 (2013.01); B02C 7/17 (2013.01); B02C 18/086 (2013.01); B02C 18/186 (2013.01); B02C 23/12 (2013.01); B02C 23/14 (2013.01); B29B 17/04 (2013.01); B02C 2018/188 (2013.01); B29B 2017/0484 (2013.01); Y02W 30/625 (2015.05)

(58) Field of Classification Search
CPC ....... B02C 23/12; B02C 23/14; B02C 18/086; B02C 18/186; B02C 17/04; B02C 7/08; B02C 7/17; B29B 9/02
See application file for complete search history.

(56) References Cited

U.S. PATENT DOCUMENTS

| | | | |
|---|---|---|---|
| 3,545,686 A | 12/1970 | Brown | |
| 3,899,965 A * | 8/1975 | Koch | B30B 3/04 100/155 R |

(Continued)

FOREIGN PATENT DOCUMENTS

WO   WO95/34418   12/1995

*Primary Examiner* — Faye Francis
(74) *Attorney, Agent, or Firm* — Harpman & Harpman

(57) ABSTRACT

An apparatus for recycling synthetic thermoplastic waste material combining heretofore multiple stage processing steps in a single stage shredder grinder pulverizer device. The apparatus has multiple interchangeable material processing blade sets on respective effacing engageable rotating and fixed blade mounts within a cooled material infeed and blade containment enclosure with multiple vacuum outlet ports and communicating vacuum ducts to draw off and transport processed material therefrom for separation and classification, as required. Each replaceable interchangeable processing blade set includes registerable shredding and grinding blades and annular pulverizing blade sets on fixed and movable mediums for progressive processing of waste material into uniform recyclable material.

11 Claims, 9 Drawing Sheets

(56) References Cited

U.S. PATENT DOCUMENTS

| | | | |
|---|---|---|---|
| 4,004,738 A | | 1/1977 | Hawkins |
| 4,395,944 A | * | 8/1983 | Siepermann .............. B30B 3/04 |
| | | | 100/168 |
| 5,285,973 A | | 2/1994 | Goforth et al. |
| 7,451,945 B2 | * | 11/2008 | Wollenhaupt ............. B02C 4/02 |
| | | | 100/168 |
| 7,841,552 B2 | * | 11/2010 | Frangenberg ............. B02C 4/02 |
| | | | 241/285.2 |
| 8,297,183 B2 | * | 10/2012 | Horster .................... B02C 4/02 |
| | | | 100/168 |
| 8,795,563 B2 | * | 8/2014 | Splinter ................... B02C 4/32 |
| | | | 100/170 |
| 9,364,834 B2 | * | 6/2016 | Wollenhaupt ............. B02C 4/02 |
| 2012/0238650 A1 | | 9/2012 | Reese et al. |

\* cited by examiner

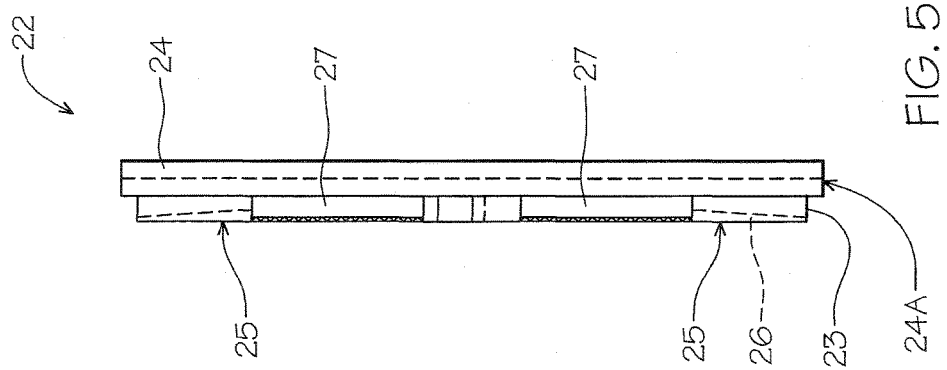
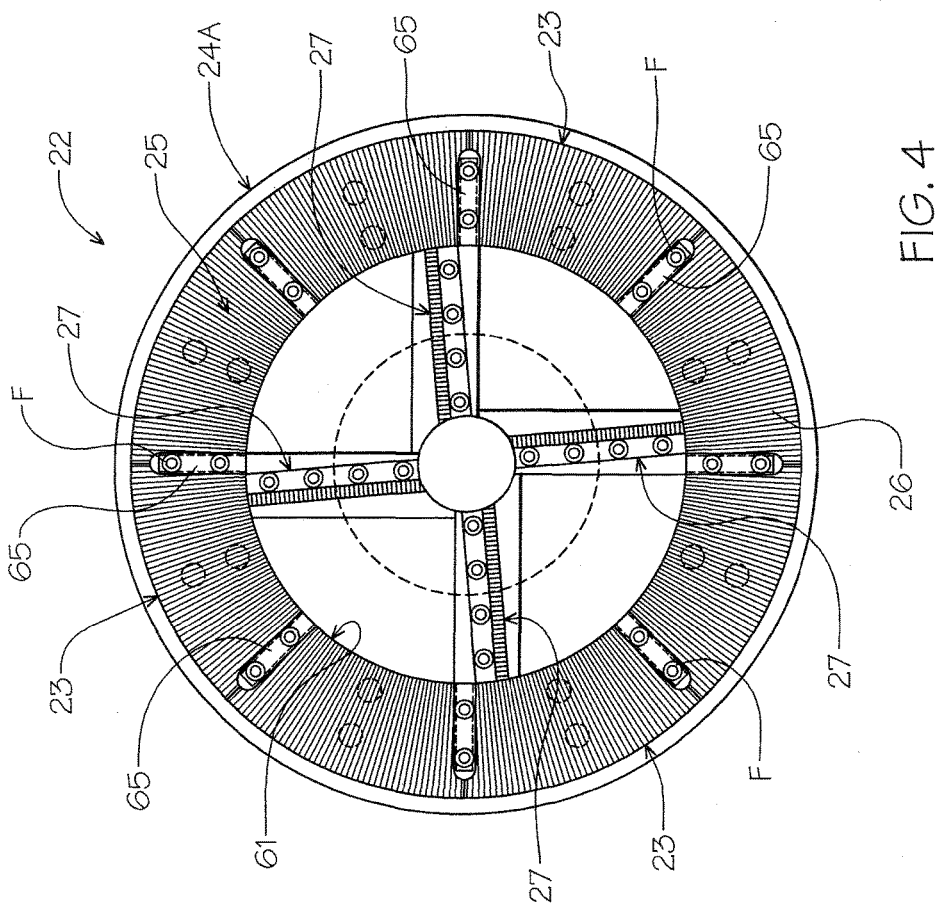

US 10,391,675 B2

CONVERTIBLE RECYCLING APPARATUS FOR SYNTHETIC RESIN MATERIALS

BACKGROUND OF THE INVENTION

1. Technical Field this invention relates to recycling process machines used to process synthetic resin plastic waste material into reusable product.

2. Description of Prior Art

Prior art apparatus and methods have been developed to process waste plastic materials into usable compositional sizes and texture by shredding and grinding using machine means and multiple reduction steps. Such prior art apparatus typically have material infeed to movable cutting blades having cutting edges engageable on a stationary cutting blade engaging and shredding continuous infeed waste materials. Examples can be seen in U.S. Pat. Nos. 3,545,686, 4,004,738, 5,285,973, U.S. Publication 2012/0238650, International Patent WO95/34418.

U.S. Pat. No. 3,545,686 is directed to a shredder for shredding sheets of polymeric material by having a pair of cutting blades on a rotary arbor and an indexed fixed blade.

U.S. Pat. No. 4,004,738 claims a method and apparatus for shredding a web of plastic film having impellor blades movable on a rotating disk and aligned fixed blades to achieve shredding there between.

U.S. Pat. No. 5,285,973 illustrates a close tolerance shredding device having multiple rotating shafts with multiple disk shaped blades and spades placed there between.

U.S. Publication 2012/0238650 is directed to a plant and method for recycling PET type plastics having a first processing line to produce pellets and a second processing line for recycling plastic flakes.

International PCT Patent WO95/34418 discloses a plastic recycler for a mix of discarded materials by feeding shredded plastic into a rotating chopping blade that shreds material until heat is generated forming a viscous mass.

SUMMARY OF THE INVENTION

A plastic recycling process device for recycling a mixture of waste plastic materials into reusable uniform size product in a single stage including shredding, grinding and pulverization. The utilization of a unique multi-stage blade assembly with interchangeable blade segments on rotating and fixed blade support provides for a single pass combined stage processing product pulverization end use of reusable material eliminating multiple product processing and transfer during recycling with improved outflow product transfer speed and efficiency.

DESCRIPTION OF THE DRAWINGS

FIG. 4 is an enlarged bottom plan view of a primary rotating multi-stage processing blade.

FIG. 5 is a side elevational view thereof.

DETAILED DESCRIPTION OF THE INVENTION

Figure 1:
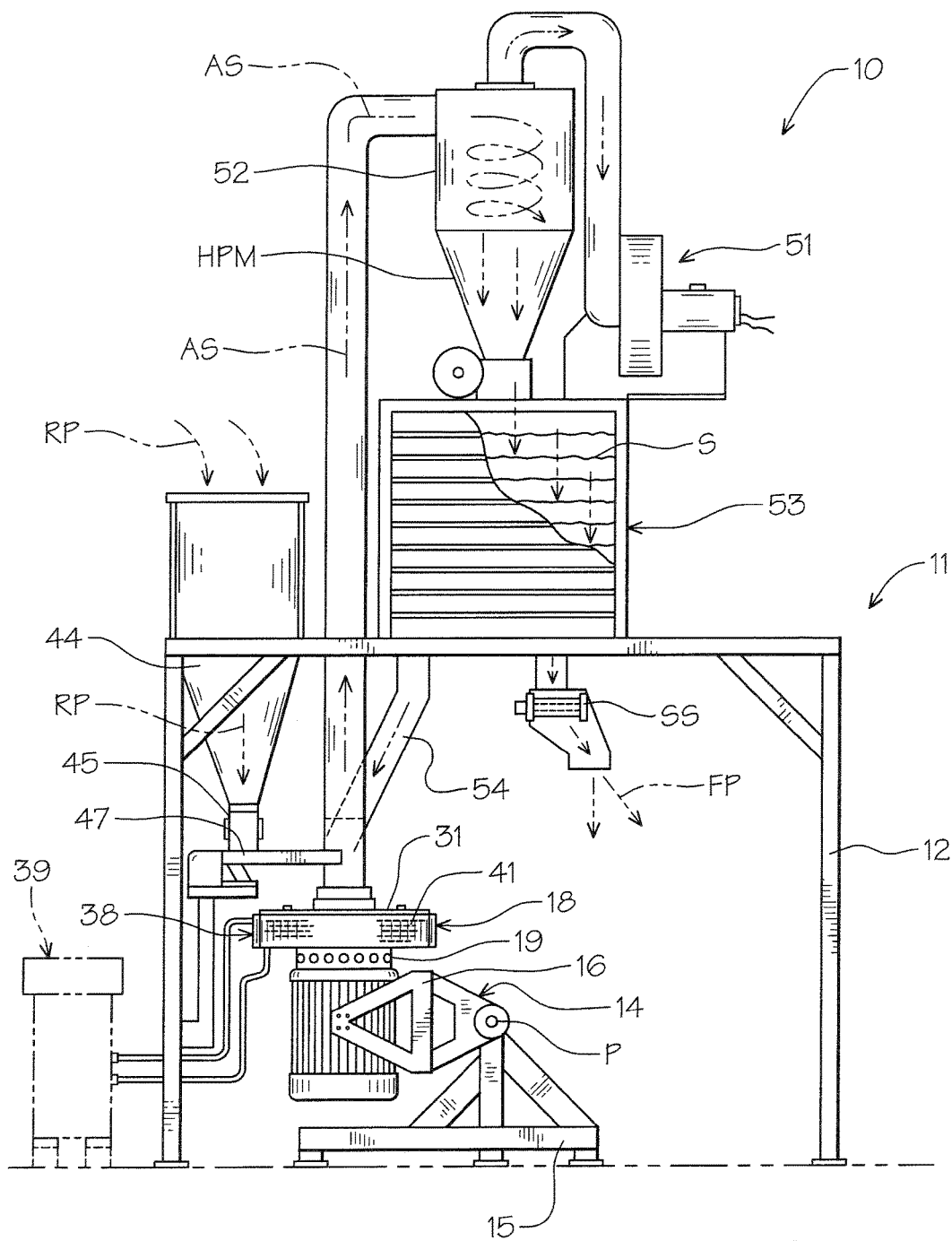
FIG. 1 is a side elevational view of the plastic recycling processor of the invention.
Figure 2:
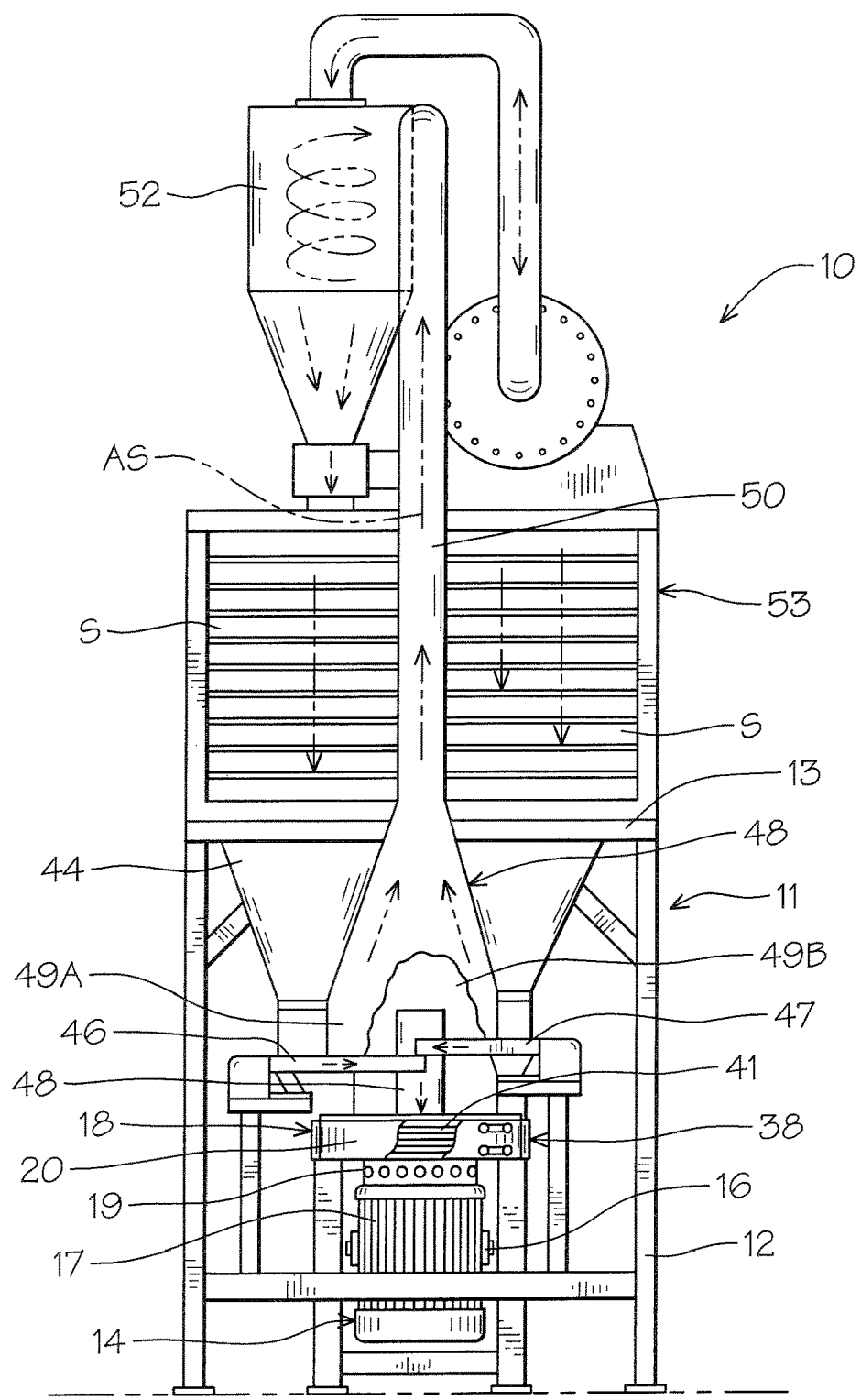
FIG. 2 is an end elevational view thereof.

Referring to FIGS. 1 and 2 of the drawings, a plastic recycling processor apparatus 10 of the invention can be seen to provide for a process of recycling a mixture of plastic materials into usable product. The plastic recycling apparatus 10 has a main support frame 11 which includes multiple interconnecting vertical and horizontal support rails 12 and 13 and a pivoting motor and blade housing support frame 14. The pivoting motor and blade housing support frame 14 has a base 15 with an upstanding bifurcated pivoting motor mount bracket 16 extending therefrom. An electric drive motor 17 is affixed within the mounting bracket 16 initially as shown in vertical orientation in FIGS. 1 and 2 of the drawings. The motor mounting bracket 16 has a pair of pivot pins P allowing for 90° rotation of the attached motor 17 from a vertical to a horizontal use orientation as will be seen in FIG. 3 of the drawings and described in greater detail hereinafter.

A material processing infeed and outflow blade housing 18 is secured to the drive motor 17 via a riser 19. The blade housing 18 has a contoured upstanding sidewall 20 extending from a corresponding contoured support base 21.

Figure 8:
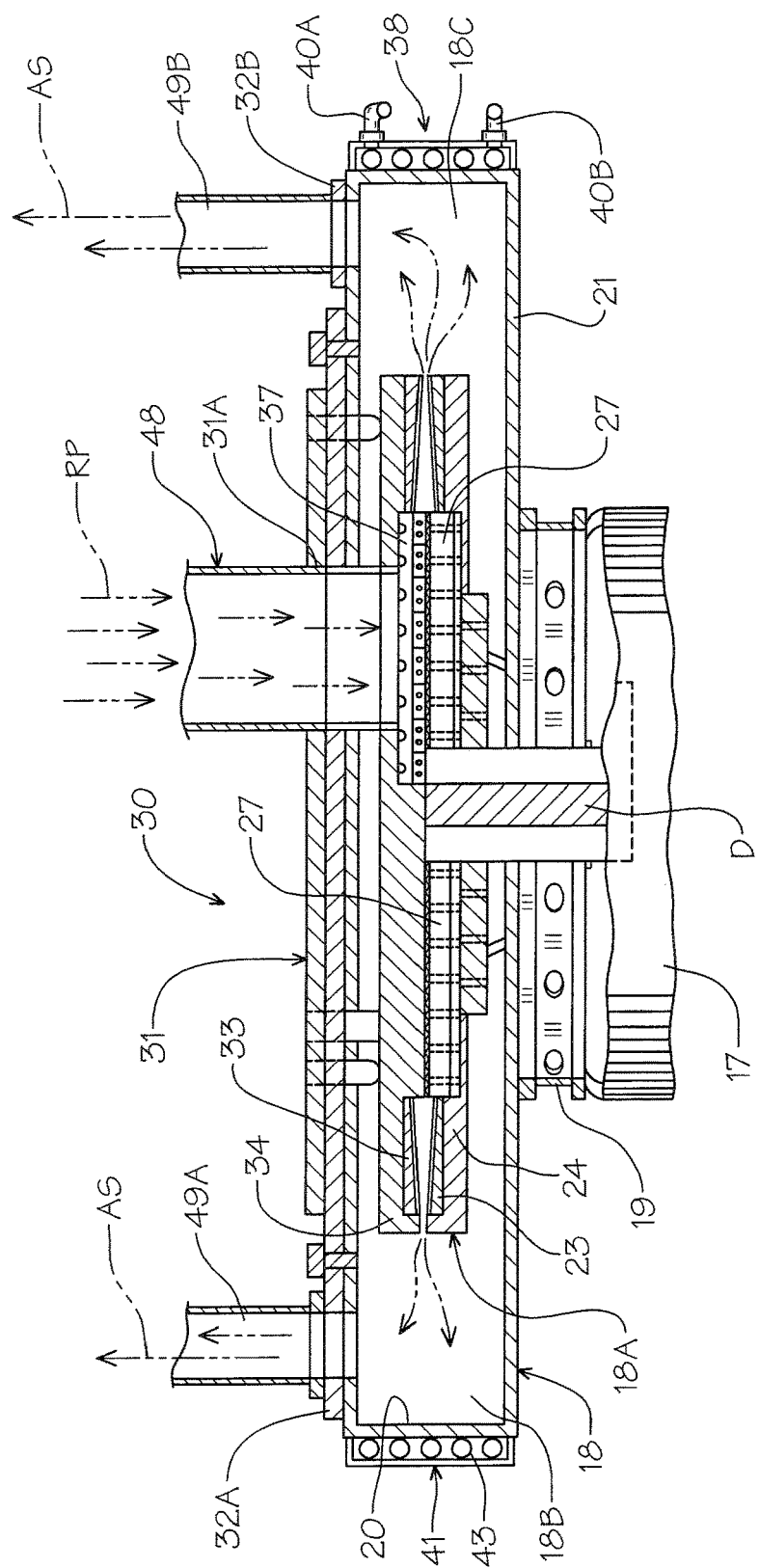
FIG. 8 is a cross-sectional view of the recycling blade housing.
Figure 9:
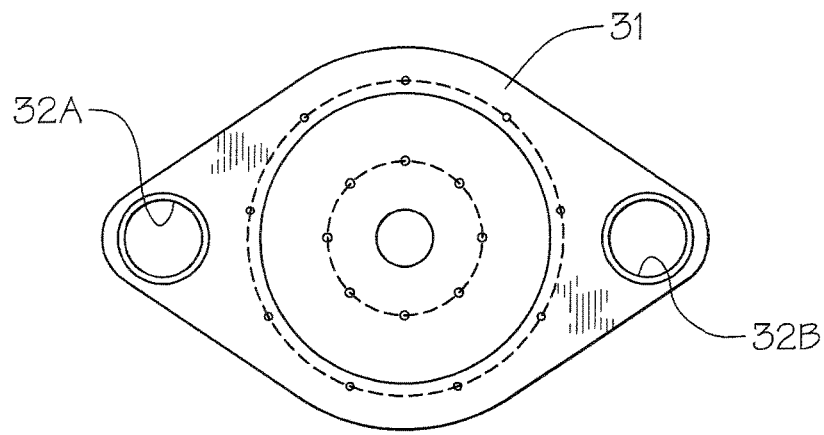
FIG. 9 is an enlarged top plan view of the recycling blade housing enclosure support lid.

A primary material processing blade disk 22 assembly is mounted to an output drive shaft D of the motor 17 for high speed rotation thereon as seen in FIG. 8 of the drawings. The blade housing 18 has a circular center area 18A in which the rotating blade disk 22 is positioned with oppositely disposed extending contoured processed material receiving areas 18B and 18C. The blade disk 22 assembly, best seen in FIGS. 4 and 5 of the drawings, has a plurality of arcuate blade inserts 23 removably secured on a blade support mounting flywheel 24. The multiple inserts 23 form a semi-continuous annular blade surface 25 inwardly from the perimeter edge 24A of the mounting disk 24. Each of the arcuate blade sections 23 have a plurality of radially aligned spaced parallel upstanding knife cutting edges 26 milled therein. Each of the blade cutting edges 26 are configured to a predetermined angular inclination dependent on user requirements and will form a progressive material processing application, as will be described hereinafter. Referring to FIGS. 12-15 of the drawings, the arcuate blade sections 23 can best be seen, each having spaced contoured outer and inner support engagement edge surfaces 60 and 61 respectively, corresponding oppositely disposed interconnecting side edges 62 and 63, each having an offset tab portion 62A and 63A which when positioned for use together on the mounting flywheel 24 in side to side engagement will define a registration slot S therebetween sequentially as shown in broken and solid lines in FIGS. 12 and 14 of the drawings.

The mounting flywheel 24 has a central opening at 24B with an upstanding perimeter edge flange 24C. Accordingly, the multiple arcuate blade sections 23 are positioned for use on the flywheel 24 abutting the upstanding perimeter edge flange 24C thereby forming an annular continuous blade band thereabout.

Figure 13:
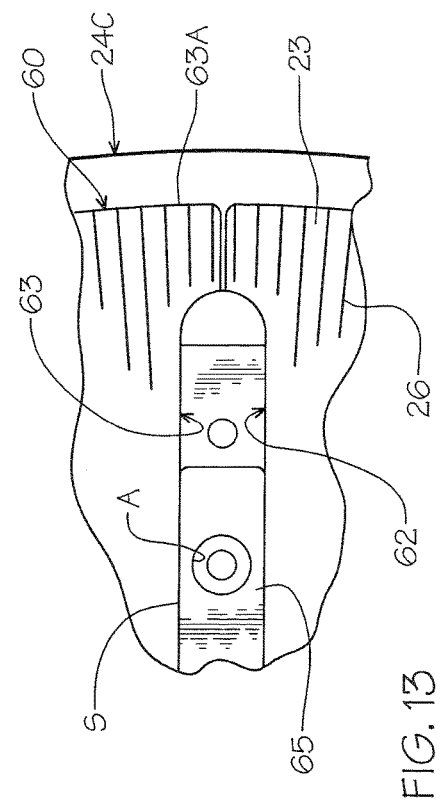
FIG. 13 is an enlarged partial top plan view of a portion of the fly wheel 24C showing wedging bars securing the blade sections thereto.
Figure 12:
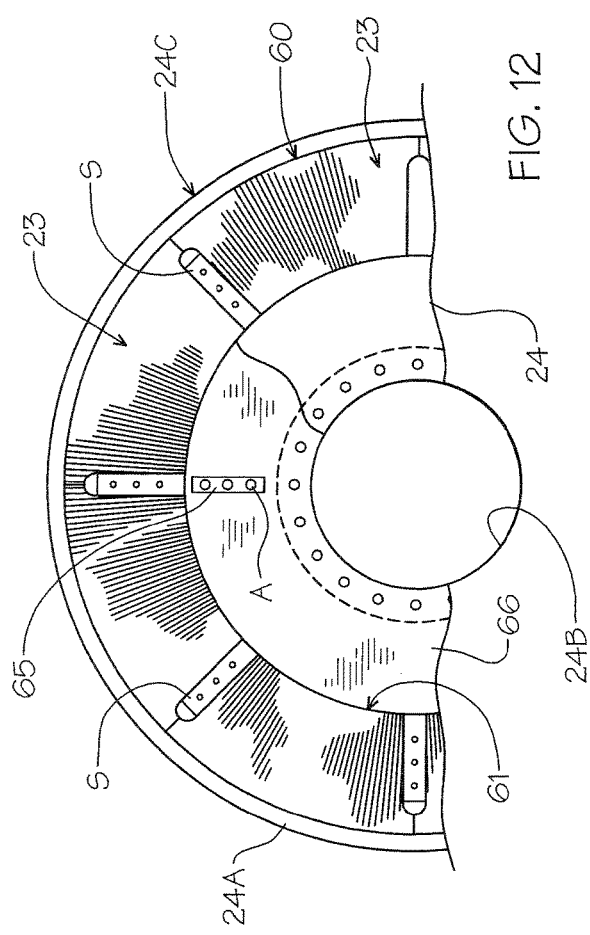
FIG. 12 is a partial top plan view with portions broken away of the mounting fly wheel with multiple blade sections positioned thereon.
Figure 15:
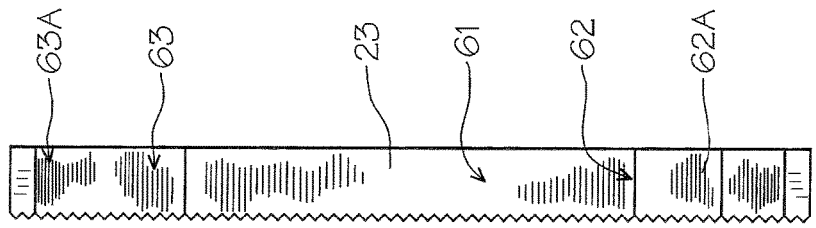
FIG. 15 is an enlarged side elevational view of the arcuate blade sections.
Figure 14:
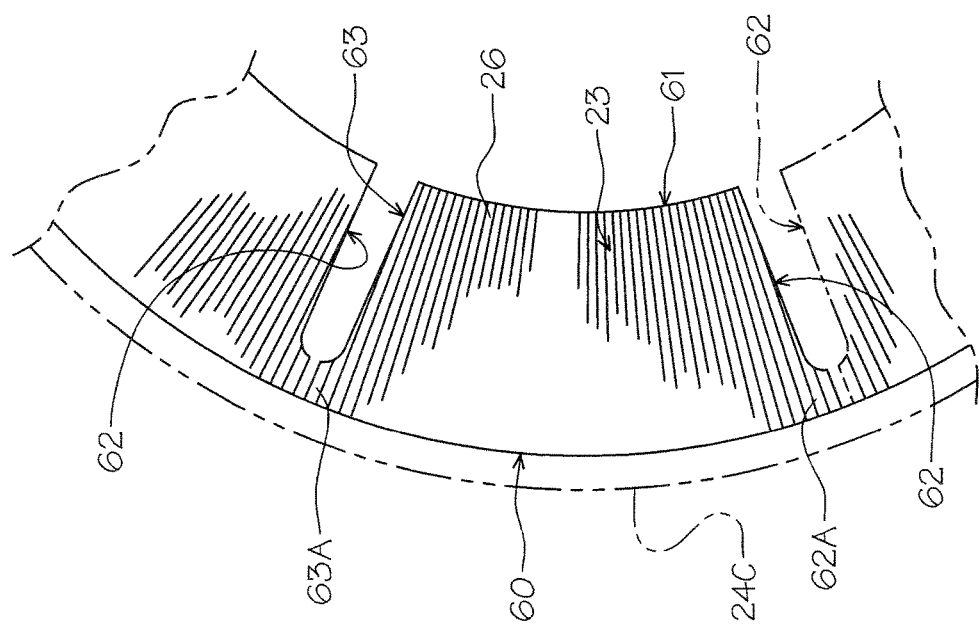
FIG. 14 is an enlarged partial top plan view of multiple blade inserts on the mounting fly wheel shown in broken lines.

Each of the hereinbefore described form registration slots S have effacing tapered edges for receiving a locking wedge bar 24 therein as best seen in FIGS. 12 and 13 of the drawings.

The wedge bars 65 each have a number of aligned apertures A for fixation fasteners there through and have corresponding interface interference surfaces along respective longitudinal edges 65A and 65B. The wedging bars 65 are driven into the defined slots S achieving a friction fit there between wedgeably retaining the so engaged multiple blade sections 23 radially against one another retained by the flywheel's perimeter edge flange 24A as illustrated. An annular apertured retainment plate 66 is fitted in this example onto the center of the flywheel 24 thereby abutting against the respective inner edge surfaces 61 of the inserts 23 which along with fixation fasteners F in the wedge bars 65 complete the annular blade assembly.

Multiple opposing primary shredding and grinding blades 27 are removably secured upstanding from the mounting disk 24 extending in spaced relation from a center axis C to the edge surface 61 of the respective annular blade sections 23 in abutment thereto. The primary blades 27 are in angular offset linear alignment to provide initial infeed product engagement as will be described.

Figure 10:
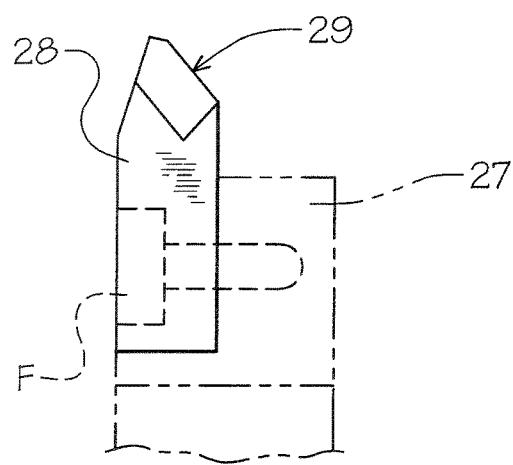
FIG. 10 is an enlarged side elevational view of a shredder grinder blade tooth.
Figure 11:
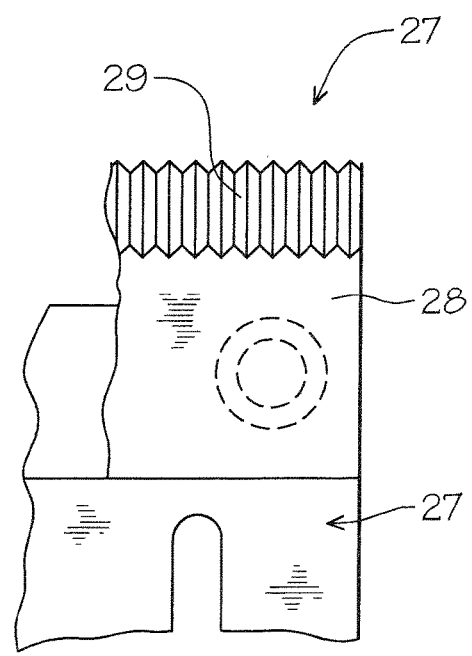
FIG. 11 is an enlarged partial front elevational view of the grinder shredder blade mount inserts support.

The primary shredding and grinding blades 27 each have a plurality of replaceable blade sets 28, best seen in FIGS. 10 and 11 of the drawings. The multiple blade sets 28 are secured in end to end relation forming an elongated continuous upstanding blade surface. Each of the blade sets 28 in turn have an inclined multiple "saw tooth" knife edge surfaces generally indicated at 29 which will afford multiple material engagement points during a cutting single pass as will be described in greater detail hereinafter.

Figure 7:
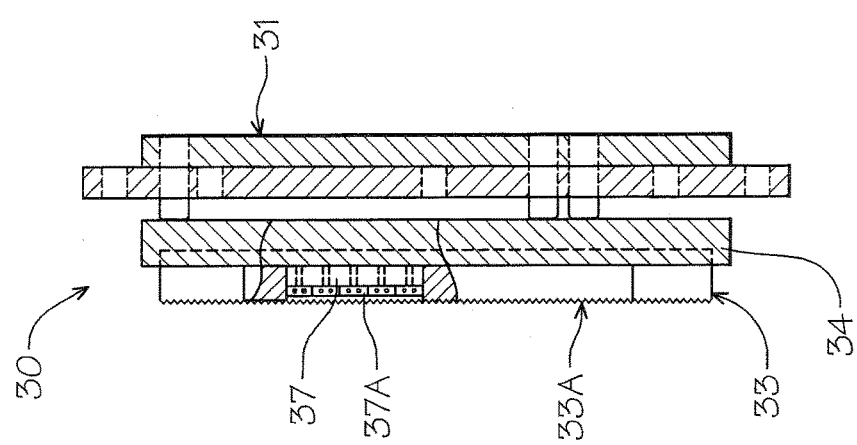
FIG. 7 is a side elevational view thereof mounted on a housing enclosure support lid assembly.
Figure 6:
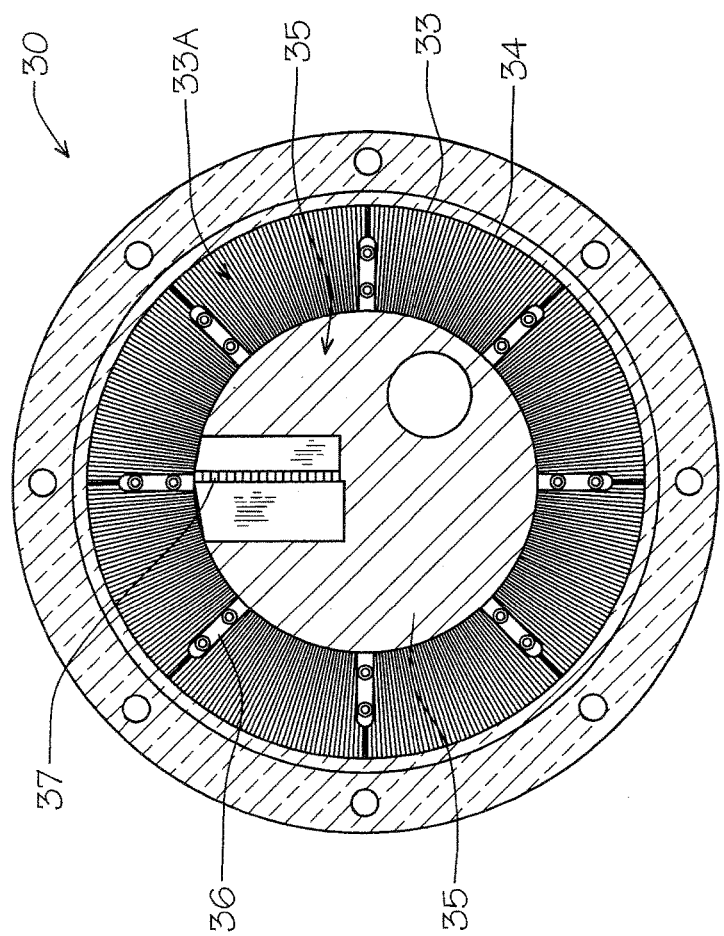
FIG. 6 is an enlarged plan view of the fixed bed multi-stage recycling blade.

Referring now to FIGS. 6, 7 and 8 of the drawings, a fixed bed blade engagement assembly 30 can be seen secured in spaced relation to a corresponding contoured blade housing closure lid 31 which is registerable over the hereinbefore described blade housing 18, sidewalls 20 thus defining the enclosed material processing housing. The closure lid 31 defines an opening for a product infeed mount and oppositely disposed vacuum ducts outflow openings and mounts 32A and 32B.

The fixed bed blade engagement assembly 30 has a corresponding multiple arcuate segmented fixed replaceable annular surface blade 33 extending inwardly from an upstanding perimeter support edge 34 on a mounting support disk 35 which in turn is secured in spaced relation to the hereinbefore described closure lid 31, as seen in FIG. 7 of the drawings.

The segmented replaceable annular blade surfaces 33 have a plurality of radially aligned parallel upstanding knife edges 33A milled therein that correspond to the hereinbefore described rotating annular blade milled surfaces 25 so as to systematically and progressively engage shredded and ground recyclable plastic product for pulverization as required for product consistency and desired final product use level.

The segmented annular surface blade 33 is secured to the fixed mounting disk 34 by an identical wedging assembly 36 of that of the rotating arcuate blade mounting sections 23, hereinbefore described.

In this example, the fixed bed blade assembly 30 has single fixed shredding bed blade 37 which extend radially from an inner edge of the segmented annular blade surface 33 as best seen in FIG. 6 of the drawings. The fixed bed blade 37 has multiple replaceable teeth inserts 37A that corresponding for progressive mesh alignment with modified saw teeth blade sets 28 of the primary rotating blades 27 so as to achieve an efficient one pass multi-surface shredding of infeed material IM by multiple material knife edge surface impacts due to the orientation and aligned integrational engagement of the respective corresponding cutting knife edges compound angular geometry.

Referring now to FIGS. 1 and 8 of the drawings, a cooling system 38 can be seen having a compressor/fluid chiller 39 with supply and return lines 40A and 40B which extend to an integrated blade housing cooling jacket 41, best seen in FIG. 8 of the drawings. The cooling jacket 41 in this example has an integrated cooling coil 43 extending around the housing 18 so as to reduce and dissipate the heat buildup during the shredding, grinding and pulverization of product material that occurs within. It will be evident that by reducing the processing material temperature, a more efficient uniform processing can be achieved without the material's propensity to stick together when heated as is common in synthetic resin processing material applications.

The cooling also enables better material transfer as the now processed material in loose form will accumulate in the defined outflow housing areas 18A and 18B directly under the vacuum outflow opening lid mounts 32A and 32B so as to be drawn outwardly by a dual vacuum tube assembly 43, best seen in FIGS. 1 and 2 of the drawings.

Selected waste material for reprocessing defined as raw product RP for product inflow is delivered to the processing housing 18 from a supply hopper 44 supported on the vertical and horizontal support rails 12 and 13 of the support frame 11. The supply hopper 44 provides for metered and control release of raw product RP through a rotary control feed valving 45 delivering the raw product RP to a pair of vibrating conveyor trays 46 and 47 which move and separate raw product RP for delivery to an upstanding central infeed housing 48 extending from the closure lid infeed opening 31A. The raw product RP is transferred into the housing 18 rotating and fixed bed blade engagement assemblies for blade engagement and reduction as hereinbefore described.

As noted, once the raw product RP has been processed by the multiple stage blade assembly expelled by centrifugal force collecting in the cut flow areas 18A and 18B, it is drawn out of the housing 18 by a dual vacuum transfer assembly 48 having a first and second vacuum transfer nozzle conduits 49A and 49B which combine upstream into a single vacuum transfer tube 50.

A force vacuum flow of material entrained airstream AS is achieved by a vacuum blower assembly 51 which draws the material up into a cyclonic particle separator 52 as seen graphically in broken lines in FIGS. 1 and 2 of the drawings. The cyclonic particle separator 52 uses specific gravity to draw off the lighter material while the heavier processed material HPM drops downwardly and is accumulated and sequentially dumped into a material classifier 53 positioned directly below. The material classifier 53 is typical within the art having multiple gradation screens S of different mesh size achieving a separation of product, as desired. The processed material which does not meet the screen criteria is diverted back at 54 into the infeed of the material processor housing 18 for reprocessing.

The finished and classified product FP is transferred out of the classifier 53 through, in this example, a magnetic metal separator 55 which achieves a final separation of any possible entrained ferrous metallic material assuring that only usable synthetic resin thermoplastic material now fully processed is passed on for recycling use.

Figure 3:
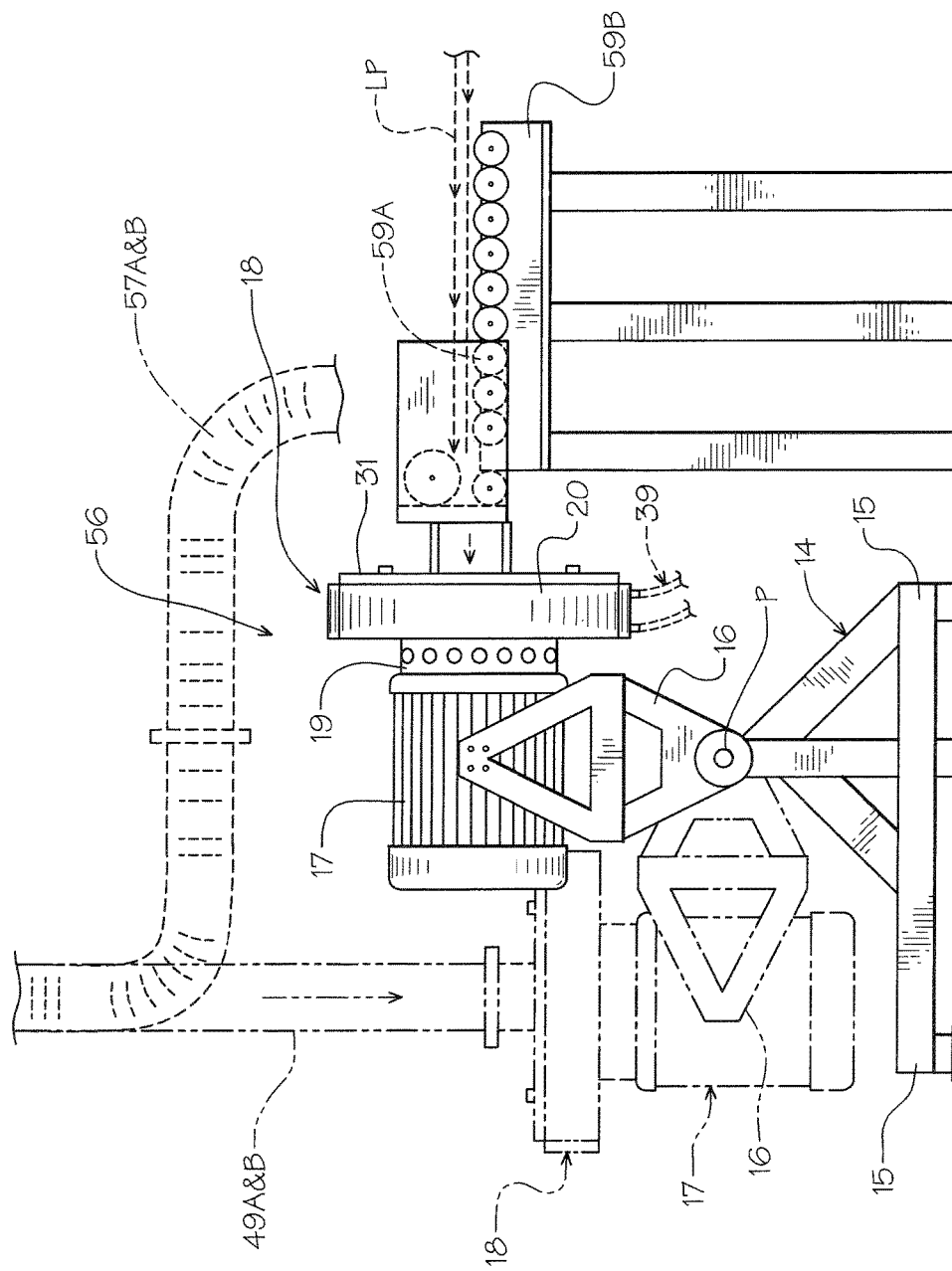
FIG. 3 is an enlarged side elevational view of the plastic recycler converted for horizontal product infeed.

Referring now to FIG. 3 of the drawings, it will be seen that the present invention can be convertible from a fixed vertical material feed processor as described above into a horizontal linear continuous fixed product processor 56. In this format, the motor 17 and attached material processing infeed and outflow blade housing 18 with processing blades are pivoted 90° by the hereinbefore described mounting bracket 16 to a horizontal orientation as shown. The vacuum outflow conduits 49A and 49B may be extended, in this example, by flexible tubular extensions 57A and 57B and the product infeed modified for an axial eccentric material opening having a horizontal material infeed assembly 58 within a guide housing 59 and multiple powered product engagement rollers 59A. In this example, a roller conveyor table 59B is also provided for support for a variety of elongated linear extending products LP represented by broken spaced parallel line arrows. In this manner, elongated waste material can be continuously fed directly into the processing housing 18 and processed by the multiple stage blade assembly 18 therein as previously described.

It will be seen therefore that with the adaptability of the present recycling processing apparatus 10 of the invention, that a single material processing installation can replace multiple processing staged equipment overall installation and associated inner transport cost to independent processors heretofore required.

It will thus be seen that a new and useful adaptable plastic recycling processing apparatus 10 has been illustrated and described and it will be apparent to those skilled in the art that various changes and modification may be made therein without departing from the spirit of the invention, therefore:

We claim:

1. A convertible plastics processor apparatus for recycling material comprises,
    a single stage pulverizer having a housing defining an enclosure,
    a first multi-blade set on a rotating support disk in said enclosure in communication with a drive motor,
    a second fixed multi-blade bed set mounted in said enclosure effacing said first blade set,
    a top material inlet portal and dual oppositely disposed ducted vacuum top material outlet openings in said enclosure,
    a centrifugal separator in communication with said ducted vacuum outlets and a source of vacuum,
    a classifier in communication with said centrifugal separator,
    cooling system on said enclosure and a remote source of cooling media in communication therewith,
    said single stage shredder, grinder, pulverizer and said drive motor movable from a first vertical infeed position to a second horizontal product infeed position.

2. The convertible plastic processor apparatus set forth in claim 1 wherein said first and second multi-blade sets include respectively,
    a continuous perimeter segmented annular blade band defining a central infeed area,
    primary linear blades within said infeed area aligned for progressive intermeshing with said second fixed bed blade sets.

3. The convertible plastic processor apparatus set forth in claim 1 wherein said second fixed multi-blade bed set is secured to a removable closure lid on said enclosure housing.

4. The convertible plastic processing apparatus set forth in claim 1 wherein said source of vacuum comprises,
    a blower in communication with said centrifugal separator.

5. The convertible plastic processor apparatus set forth in claim 1 wherein said classifier includes,
    multiple screens in aligned spaced orientation with one another and of varying screen mesh dimensions.

6. The convertible plastic processor apparatus set forth in claim 1 wherein said drive motor is secured to a mounting frame having aligned pivots for vertical to horizontal motor orientation.

7. The convertible plastic processor apparatus set forth in claim 1 wherein said cooling system on said blade enclosure comprises, a cooling coil around said blade enclosure, fluid chiller in communication with said cooling coil.

8. The convertible plastic processor apparatus set forth in claim 2 wherein said continuous perimeter edge segments annular blade band segments define wedging slots there between, locking wedge bars registerable within said slots.

9. The convertible plastic processing apparatus set forth in claim 2 wherein said perimeter annular blade band segments have a plurality of spaced parallel radial tapered milled blade edges.

10. The convertible plastic processing apparatus set forth in claim 2 wherein said linear blades have saw tooth knife edges.

11. The convertible plastic processor apparatus set forth in claim 6 wherein said drive motor and said single stage pulverizer in horizontal infeed product position further comprises, a horizontal product infeed assembly having a guide and material transfer system in communication therewith.

* * * * *